(12) United States Patent
Kooima

(10) Patent No.: US 8,011,873 B2
(45) Date of Patent: Sep. 6, 2011

(54) DOUBLE CYLINDER TILT RECOVERY SYSTEM

(76) Inventor: Roger D. Kooima, Canton, SD (US)

( * ) Notice: Subject to any disclaimer, the term of this patent is extended or adjusted under 35 U.S.C. 154(b) by 1159 days.

(21) Appl. No.: 11/216,266

(22) Filed: Aug. 31, 2005

(65) Prior Publication Data

US 2007/0059134 A1    Mar. 15, 2007

(51) Int. Cl.
*B60P 3/12* (2006.01)
(52) U.S. Cl. ........................................ 414/563
(58) Field of Classification Search ............ 414/563
See application file for complete search history.

(56) References Cited

U.S. PATENT DOCUMENTS

| | | | |
|---|---|---|---|
| 3,951,280 A | 4/1976 | Peck | |
| 3,956,970 A * | 5/1976 | Kupiek et al. | 91/173 |
| 4,191,276 A * | 3/1980 | Farmer et al. | 187/227 |
| 4,473,334 A * | 9/1984 | Brown | 414/563 |
| 4,632,629 A | 12/1986 | Kooima | |
| 4,678,392 A | 7/1987 | Capers et al. | |
| 4,775,285 A * | 10/1988 | Zackovich | 414/563 |
| 4,797,058 A | 1/1989 | Bilas | |
| 4,852,464 A * | 8/1989 | Bartmann et al. | 92/53 |
| 5,236,214 A | 8/1993 | Taylor | |
| 5,326,216 A | 7/1994 | Russ | |
| 5,354,167 A | 10/1994 | Cullum et al. | |
| 5,672,042 A * | 9/1997 | Bartel | 414/563 |
| 5,823,735 A | 10/1998 | Kooima | |
| 5,853,283 A | 12/1998 | Grant | |
| 6,036,428 A | 3/2000 | Kooima | |
| 6,095,748 A * | 8/2000 | Zackovich | 414/563 |
| 6,116,140 A * | 9/2000 | Barthalow et al. | 91/167 R |
| 6,450,481 B1 * | 9/2002 | Oxtoby | 254/93 H |
| 7,100,897 B2 * | 9/2006 | Ha | 254/93 R |
| 7,171,807 B2 * | 2/2007 | Fox et al. | 60/478 |

* cited by examiner

*Primary Examiner* — James Keenan
(74) *Attorney, Agent, or Firm* — McKee, Voorhees & Sease, P.L.C.

(57) ABSTRACT

The current invention is a portable wheel lift device for lifting and towing vehicles comprising a boom which pivots up and down for connecting to and raising a portion of a vehicle which is to be towed. The invention comprises a mounting frame adapted to be attached to a towing vehicle and a two-stage cylinder assembly operatively connected to the mounting frame and the boom for tilting the pivoting boom relative to the mounting frame.

16 Claims, 8 Drawing Sheets

DOUBLE CYLINDER TILT RECOVERY SYSTEM

BACKGROUND OF THE INVENTION

This invention relates to a device which can be attached to a vehicle and used for lifting and towing other vehicles. Specifically, this invention relates to a double cylinder tilt recovery system.

Many types of devices have been used in the past for connecting and towing vehicles. These types of devices generally operate with one or more hydraulic cylinders to raise the vehicle which is to be towed. One problem with these type of devices is, however, that in order to get the strength from a hydraulic cylinder to raise a heavy vehicle the hydraulic cylinder must be very large. The downfall of a large cylinder is that it operates or extends very slowly. Therefore, when the operator is done using the towing device and wishes to stow the boom of the towing device getting the boom to the stowed position is a very slow process. Thus, there is a need for an improved and faster operating towing device.

In light of the foregoing, it is a primary feature or advantage of the present invention to provide an improved double cylinder tilt recovery system.

A further feature or advantage of the current invention is a towing device which can be easily attached to vehicles, such as a road tractor.

A further feature or advantage of the current invention is a two-stage cylinder which is faster than traditional single stage cylinders.

A further feature or advantage of the invention which has power to lift vehicles, yet stows faster than comparable powered lifts.

A further feature or advantage of the current invention is the provision of a double cylinder tilt recovery system which is economical to manufacture, durable in use, and efficient in operation.

One or more of these or other features or advantages of the invention will become apparent from the specification and claims that follow.

BRIEF SUMMARY OF THE INVENTION

The foregoing features or advantages may be achieved by a portable wheel lift device for lifting and towing vehicles comprising a boom which pivots up and down for connecting to and raising a portion of a vehicle which is to be towed, a mounting frame, a means for attaching the mounting frame to a towing vehicle, and a two-stage cylinder assembly operatively connected to the mounting frame and the boom for tilting the pivoting boom relative to the mounting frame.

A further feature or advantage of the current invention is a portable wheel lift device for lifting and towing vehicles which has a boom that is a telescoping boom.

A further feature or advantage of the current invention is a portable wheel lift device for lifting and towing vehicles which has a two-stage cylinder that has a first stage piston and a smaller second stage piston.

A further feature or advantage of the current invention is a portable wheel lift device for lifting and towing vehicles wherein a second stage of a two-stage piston extends only after the first stage piston has fully extended.

A further feature or advantage of the current invention is a portable to about vertical stowing position when the device is mounted to a towing vehicle and both stages of a two-stage cylinder are extended.

A still further feature or advantage of the current invention is a two-stage cylinder wherein the second stage piston travels within a small piston tube and the small piston tube is affixed within a large cylinder rod and the large cylinder rod is affixed to the large piston.

A further feature or advantage of the current invention is a portable wheel lift device for lifting and towing vehicles which has a boom that pivots up and down.

A further feature or advantage of the current invention is a portable wheel lift device for lifting and towing vehicles which has a two-stage cylinder wherein the small piston travels within a small piston tube and the small piston tube is affixed within a large cylinder rod and the large cylinder rod is affixed to the large piston.

A further feature or advantage of the current invention is a portable wheel lift device for lifting and towing vehicles which has a kingpin for mounting to a road tractor.

A further feature or advantage of the current invention is a portable wheel lift device for lifting and towing vehicles which has one or more lift cylinders for lifting the towing device relative to the mounting frame. In addition, the device may have guide rollers which travel in a track to guide the lifting with the cylinders and the boom. The device may also comprise a push rod operatively connected between the two-stage cylinder and the boom.

One or more of the foregoing features or advantages may be achieved by a vehicle towing device for mounting to a road tractor comprising a towing vehicle attachment assembly for mounting the device to the road tractor, a boom lift assembly operatively connected to the towing vehicle attachment assembly, the boom lift assembly having one or more hydraulic cylinders for lifting the boom assembly in a linear plane and a two-stage cylinder assembly operatively connected between the boom lift assembly and the boom for pivoting the boom about a pivot point for lifting vehicles attached to the boom for towing.

One or more of the foregoing features or advantages may also be achieved by a two-stage hydraulic cylinder assembly comprising a large cylinder body, a large piston which travels linearly within the cylinder body, a large hollow piston rod connected to the large piston which travels linearly with the large piston and extending out of the large cylinder body, a small hollow piston tube connected within the large piston rod which travels linearly with the large piston rod, a small piston which travels linearly within the small piston tube and a small piston rod connected to the small piston which travels linearly with the small piston within the small piston tube and extends outside of the small piston tube.

A further feature or advantage of the present invention involves a two-stage hydraulic cylinder assembly wherein a small piston tube is welded to a large cylinder rod.

A further feature or advantage of the present invention involves a two-stage hydraulic cylinder assembly where a large piston extends linearly within the large cylinder body before a small piston extends linearly within the small piston tube.

DETAILED DESCRIPTION OF THE PREFERRED EMBODIMENT

Figure 1:
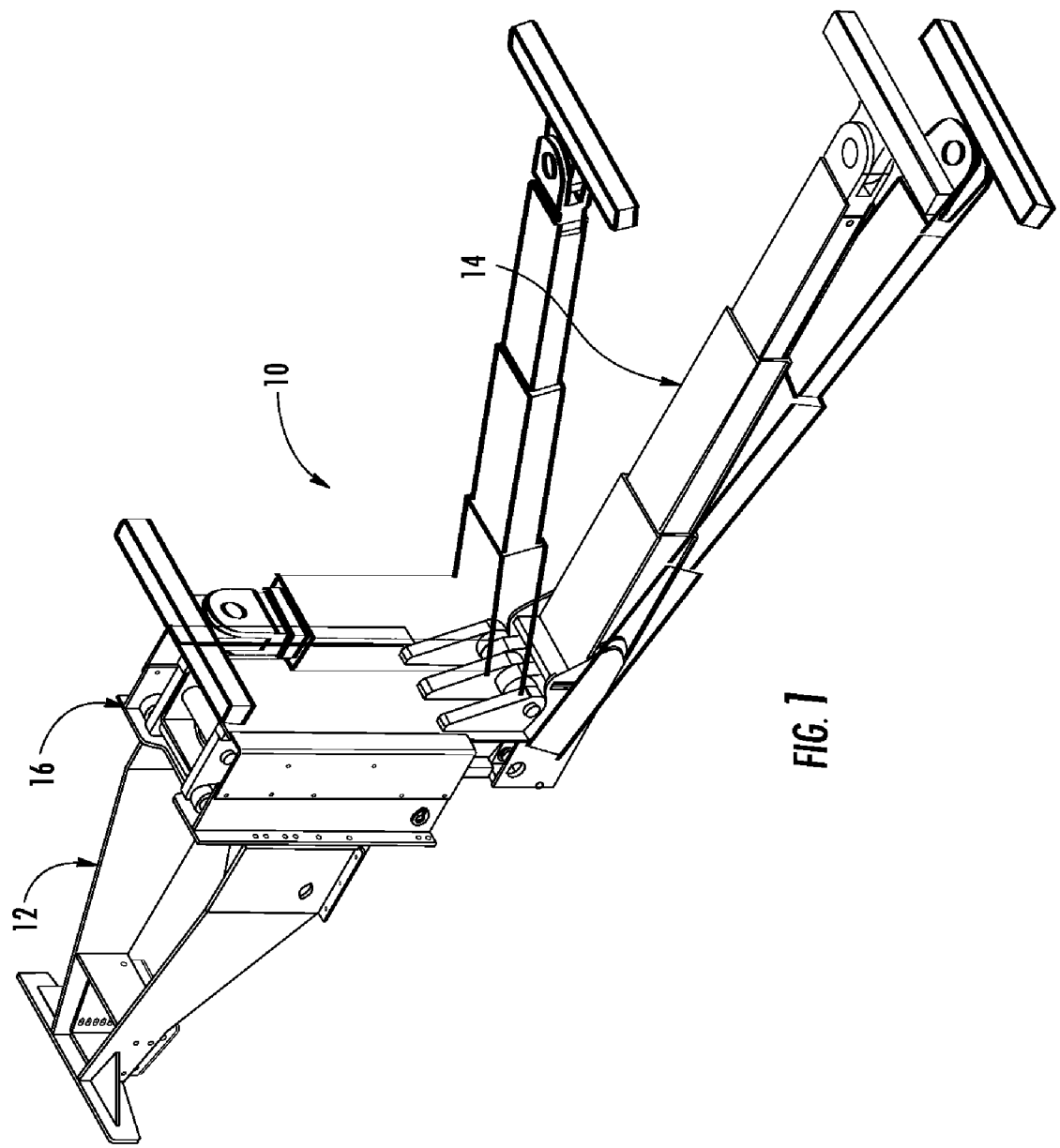
FIG. 1 is a perspective view of one embodiment of the current invention with a boom shown in multiple locations.
Figure 2:
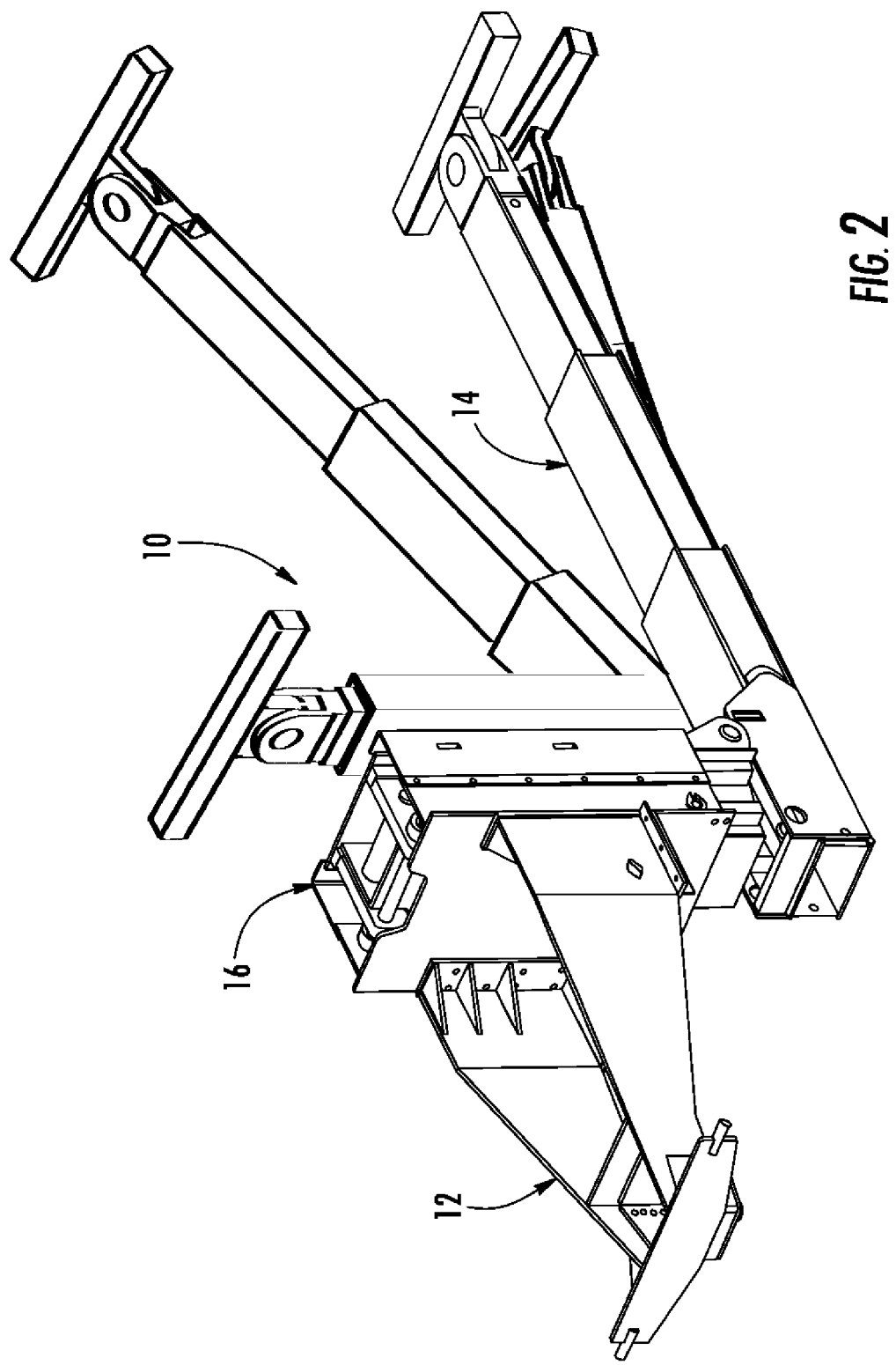
FIG. 2 is a perspective view of one embodiment of the current invention with the boom shown in multiple locations.

FIGS. 1 and 2 show one embodiment of the tilt recovery auto lift system assembly 10 of the current invention. The invention is a device which mounts to a towing vehicle and connects to and lifts a vehicle which is to be towed. A two-stage cylinder assembly 38 for tilting a boom 14 allows the boom to be raised and lowered, for use and stowing, much faster than traditional vehicle towing recovery systems.

Both FIGS. 1 and 2 show the lift system 10 with the boom assembly 14 in multiple positions. It is preferred, but not necessary, that the boom 14 be a telescoping boom. In addition, the lift system assembly 10 generally comprises a vehicle towing attachment assembly 12. The vehicle towing attachment assembly 12 preferably has a kingpin for attaching to a towing vehicle (not shown) at a fifth wheel plate of a road tractor. The preferred towing vehicle attachment assembly 12 is like that shown in U.S. Pat. Nos. 5,823,735 and 6,036,428 for Kooima, which are both herein incorporated by reference in their entirety. However, any towing vehicle attachment assembly 12 which allows the tilt recovery auto lift system assembly 10 of the current invention to be attached to a towing vehicle will work with the current invention.

The invention also has a boom lift assembly 16 which attaches to a boom lift assembly mounting frame 20 and preferably uses one or more vertical hydraulic lift cylinders 18 attached between the boom lift assembly mounting frame 20 and the boom lift assembly lifting frame 22 for raising and lowering the boom lift assembly 16 and the boom assembly 14.

Figure 3:
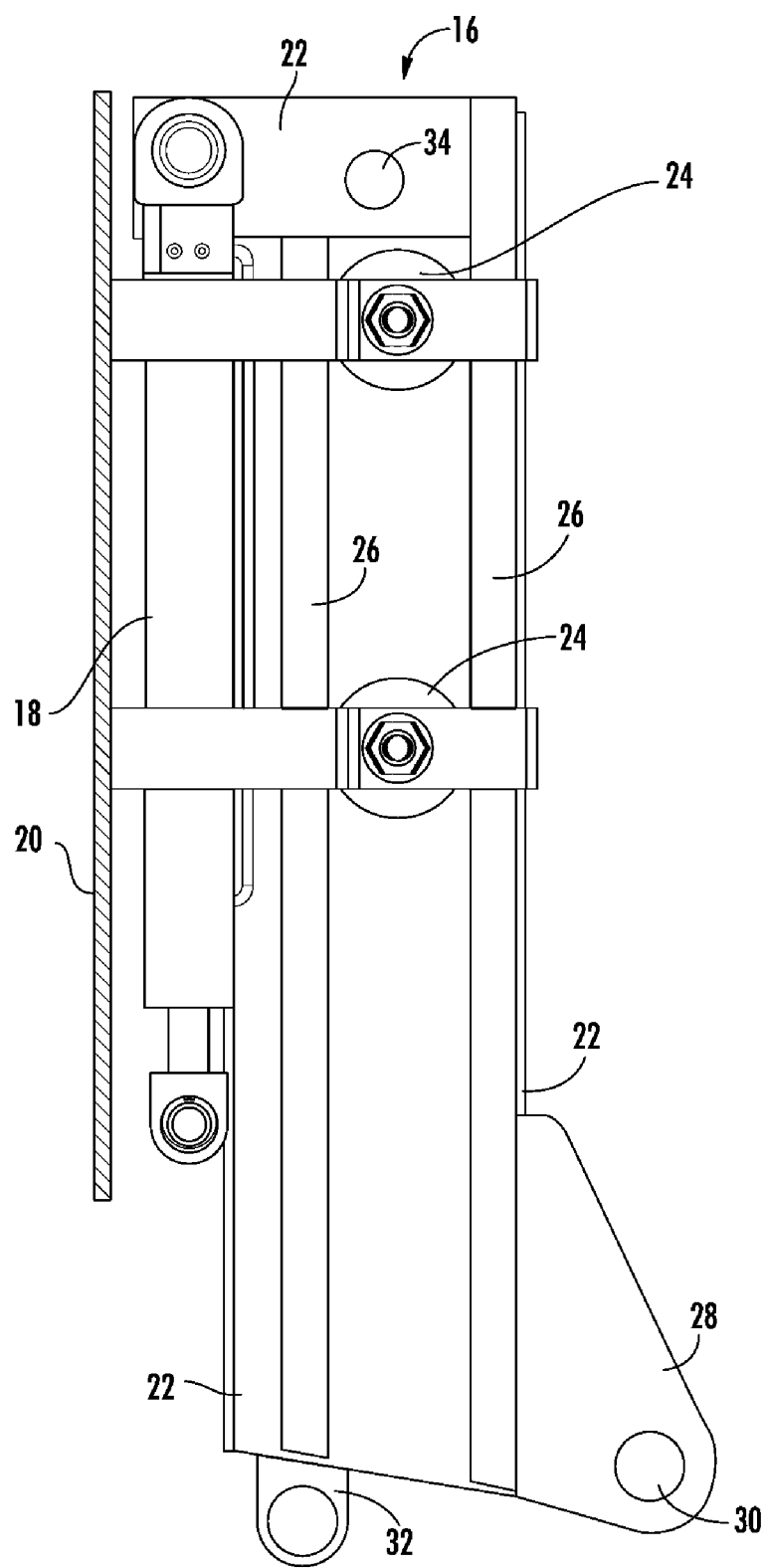
FIG. 3 is an elevation view of one embodiment of the boom lift assembly.

FIG. 3 shows a close-up side view of one embodiment of the boom lift assembly 16. The boom lift assembly 16 has a boom lift assembly mounting frame 20 which mounts to a towing vehicle attachment assembly 12. The boom lift assembly mounting frame 20 can be permanently mounted or affixed to the towing vehicle attachment assembly or may be removable.

The vertical hydraulic lift cylinders 18 which can raise or lower the boom lift assembly 16 including the boom lift assembly lifting frame 22 with respect to the boom lift assembly mounting frame 20. One or more vertical guide rollers 24 are preferred to travel within a vertical lift guide track 26. The rollers 24 guide the travel of the boom lift assembly lifting frame 22. It is preferred that the vertical lift guide track 26 be linear so that when the boom lift assembly lifting frame 22 raises and lowers the boom lift assembly 16 can travel in a linear motion up and down raising and lowering the boom assembly 14.

The boom assembly 14 pivotally mounts to the boom lift assembly 16 with connector rods or pins (not shown) at the boom pivot point 30 on the boom pivot bracket 28 and also at the push rod 32. This is best shown in FIGS. 7-10.

Figure 4:
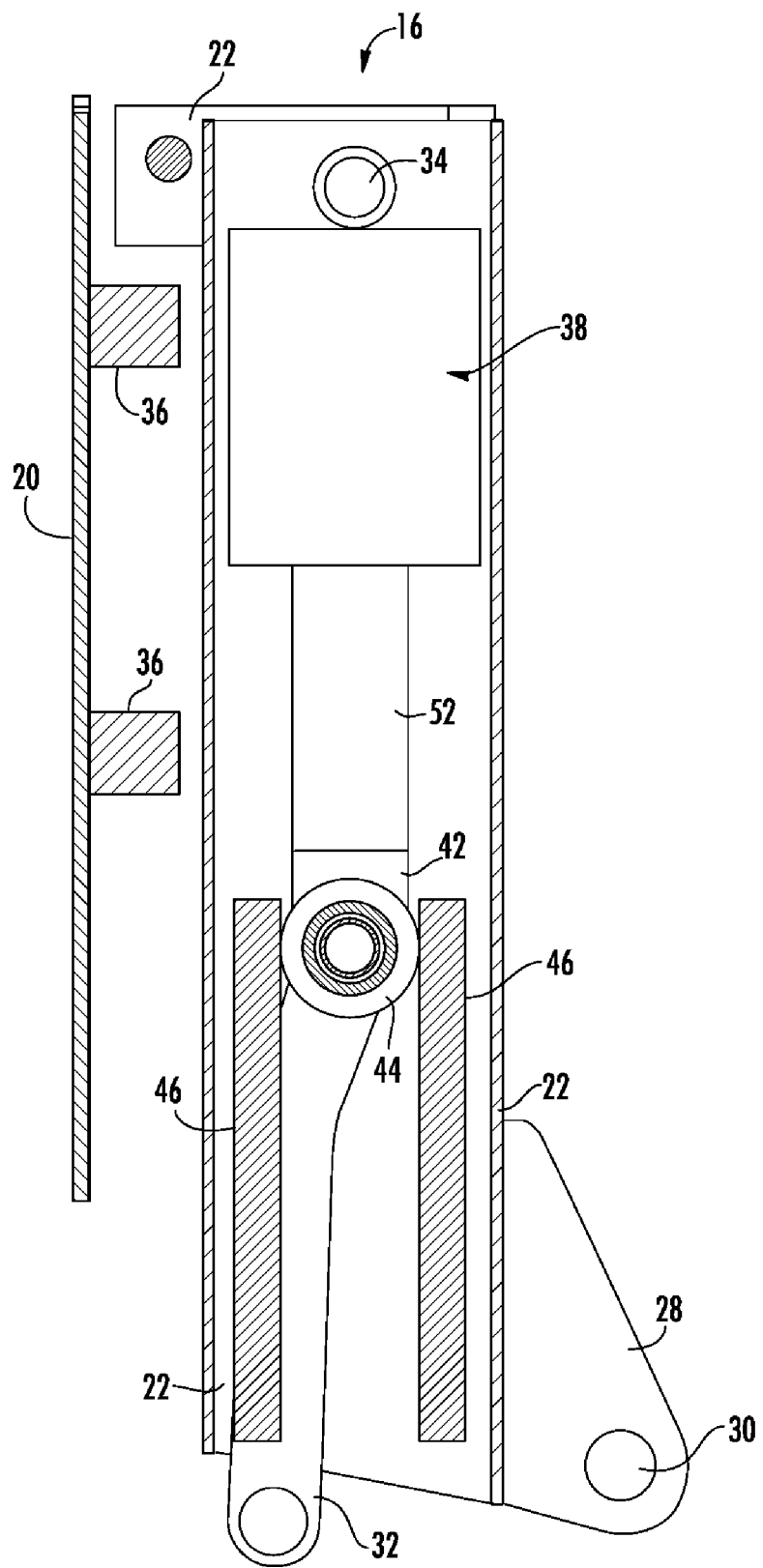
FIG. 4 is a cut away side view of one embodiment of the boom lift assembly.

FIG. 4 shows a cut away view of the boom lift assembly 16 of FIG. 3. This view shows back ribs 36 attached to the boom lift assembly mounting frame 20. In addition, the two-stage cylinder assembly 38 is shown attached to the boom lift assembly lifting frame 22 at the two-stage cylinder pivot point 34. The two-stage cylinder pivot point 34 is preferably a pin which allows the two-stage cylinder assembly 38 to rotate about the two-stage cylinder pivot 34.

A large cylinder rod 52 and a small piston rod 58 travel in and out of the two-stage cylinder assembly 38 and move a clevis 42. It is preferred that the clevis 42 be attached with a pin to both the push rod 32, for pivoting the boom assembly 14, and a cylinder containment roller 44. A cylinder containment roller 44 preferably travels within cylinder roller track 46 to guide the travel of the large cylinder rod 52 and the small piston rod 58 within the boom lift assembly 16. This helps to prevent damage or binding of the two-stage cylinder assembly 38 when lifting heavy vehicles.

Figure 5:
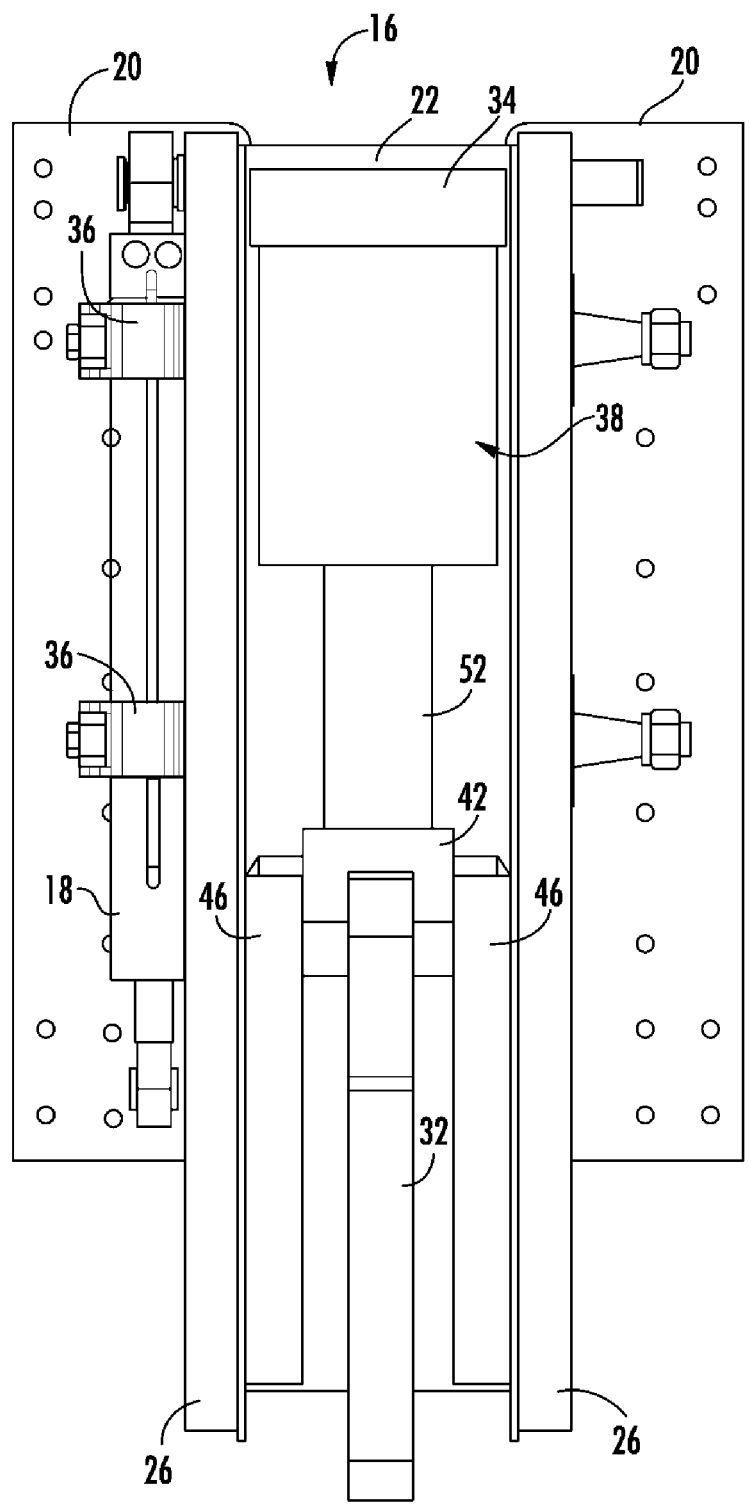
FIG. 5 is another elevation view of one embodiment of the boom lift assembly.

FIG. 5 shows an elevation view of the boom lift assembly 16 as viewed from the boom assembly 14 towards a towing vehicle. In this view, a vertical hydraulic lift cylinder 18 and the back ribs 36 are not shown on the right hand side for clarity sake.

Figure 6:
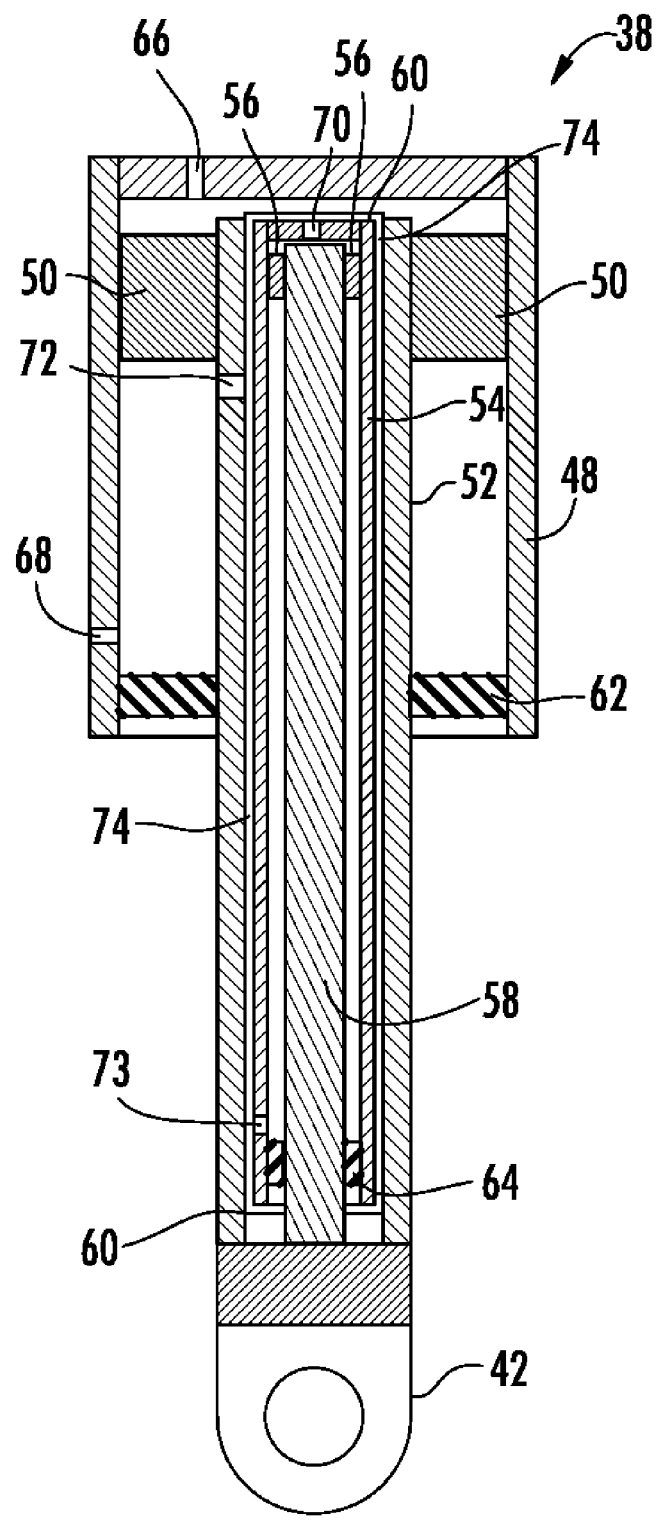
FIG. 6 is a cut away view showing one embodiment of the two-stage cylinder assembly.

FIG. 6 shows a cut away view of the preferred embodiment of the two-stage cylinder assembly 38. The two-stage cylinder assembly 38 is constructed with a large cylinder body 48. The cylinder body is preferably steel or some other rigid material capable of withstanding the pressures generated within the two-stage cylinder assembly 38.

A large piston 50 travels linearly within the large cylinder body 48. The large piston 50 should be sized large enough to be able to generate enough lifting force to be able to lift and tow vehicles which are to be towed with the current invention. There should be a small gap between the inside of the large cylinder body 48 and the large piston so as to allow lubricant or pressurizing fluid to pass between the inside of the large cylinder body 48 and the large piston. However, a gap between the piston 50 and the large cylinder body 48 should still be small enough to seal so that fluid pressure can move the piston 50 within the large cylinder body 48 as is customary in hydraulic cylinders. Additionally, the large piston 50 may be encircled by one or more piston rings or seals to help create the needed seal to build pressures to move the large piston 50 within the large cylinder body 48.

Pressurized fluid enters the large cylinder body 48 through the large piston extend fluid port 66 to create greater pressure or force above the large piston 50 and pushes the large piston 50 downward within the large cylinder body 48. As the large piston 50 moves downward it displaces the fluid below the piston so that the fluid flows out of the large piston retract fluid port 68. To retract the large piston 50, fluid then flows into the large piston retracted fluid port 68 creating a greater pressure or force below the large piston 50 and displacing the fluid above the large piston 50 so that the fluid then flows out of the large piston extend to the fluid port 66 and the large piston 50 is able to move upward.

A rigid large piston rod/tube 52 is attached to the large piston 50. The large piston rod/tube 52 will be referred to as a rod because it is attached to the large piston 50 and travels linearly with the large piston 50 to extend and retract in and out of the large cylinder body 48. However, the large piston rod 52 is hollow inside thereby resembling a tube. There are one or more large rod seals 62 which keep the pressurizing fluid within the large cylinder body 48.

A small piston tube 54 is attached within the large piston rod 52. It is preferred that a weld joint 60 attach to the small piston tube 54 within the large piston rod 52. However, any attachment means to attach the small piston tube 54 within the large piston rod 52 can be used. A fluid passageway 74 should be maintained between the small piston tube 54 and the large piston rod 52 so that fluid may flow between the two parts for actuating the second stage of the two-stage cylinder assembly 38.

A small piston 56 is located within the small piston tube 54 and travels linearly within the small piston tube 54. The small piston 56 travels linearly within the small piston tube 54 as fluid enters the small piston extend fluid port 70 with a force or pressure to slide the small piston 56 within the small piston tube 54. A small gap should be between the small piston 56 and small piston tube 54 for allowing a lubricant to lubricate the sliding action of the two parts. However, as with the large piston 50, one or more seals or piston rings may be used to reduce flow of pressurizing fluid past the small piston 56.

To retract the small piston 56, fluid flows through the small piston retract fluid port 72 in the large piston rod 52 and through the small piston retract fluid port 73 in the small piston tube 54 for pushing the small piston 56 back through the small piston tube 54.

A rigid small piston rod 58 is attached to the small piston 56 and travels linearly with the small piston 56 within the small piston tube 54. A small rod seal 64 seals the bottom end of the small piston tube 54 to prevent leakage of pressurizing fluid. It is preferred that a clevis 42 be attached to the end of the small piston rod 58 for pushing the push rod 32 thereby pivoting the boom assembly 14 about the boom pivot point 30. The clevis 42 can also rest on the ends of the large piston rod 52 for added pressure and strength when pushing the clevis 42 for operating the boom assembly 14. This only works for the travel distance of the large piston rod 52. Then, once the large piston rod 52 reaches the extent of its travel, the second stage of the two-stage cylinder assembly 38, the small piston 56 and the small piston rod 58 travel beyond the travel distance of the large piston 50 and the large piston rod 52. At this point, the clevis 42 is moved by the small piston rod 58.

FIGS. 7-10 show cut away views of the tilt recovery auto lift system 10 with the boom assembly 14 in various positions. The cut away views 7-10 show how the two stages for the two pistons 50, 56 and rods 52, 58 travel within the two-stage cylinder assembly 38 and pivot the boom assembly 14 about the boom pivot point 30 to attach to and tow a vehicle, and also to store the boom assembly 14 when not in use.

Figure 7:
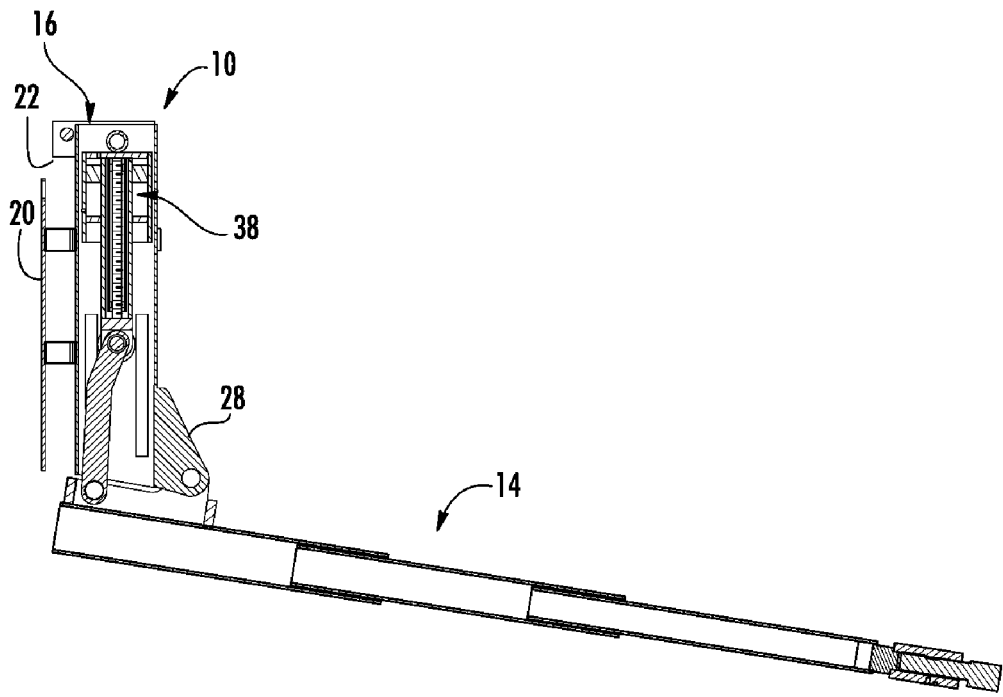
FIGS. 7-10 are side cut away views showing one embodiment of the tilt recovery auto lift system of the current invention with the boom in multiple positions.
Figure 8:
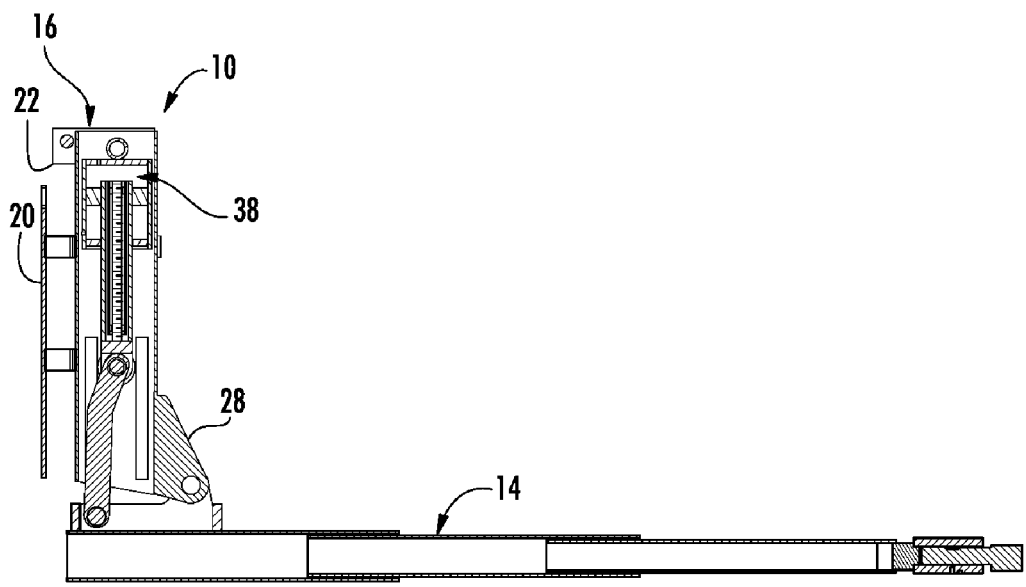
Figure 9:
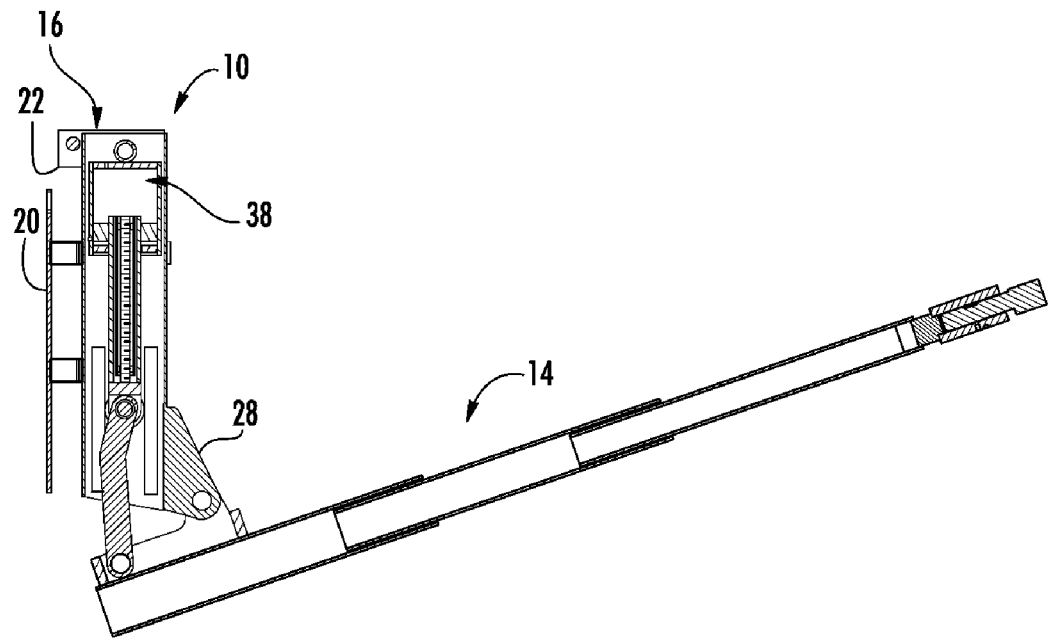
Figure 10:
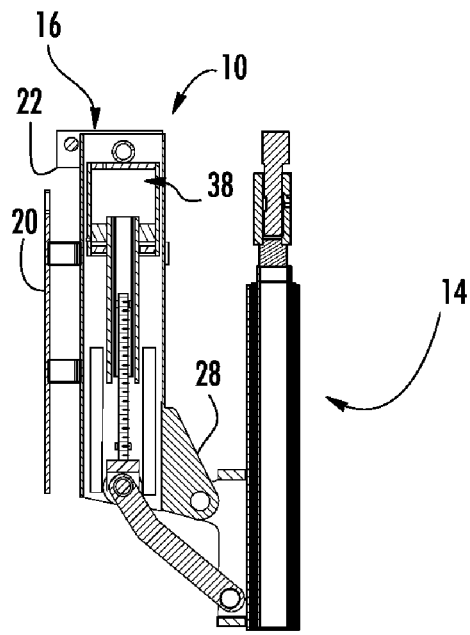

FIG. 7 shows both the small piston 56 and the large piston 50 in an unextended or retracted position thereby causing the boom assembly 14 to be approximately 10° below horizontal position. FIG. 8 shows the small piston 56 unextended and the large piston 50 approximately halfway extended, thereby causing the boom assembly 14 to be approximately horizontal. FIG. 9 shows the small piston 56 unextended and the large piston 50 fully extended, as would be in many situations for towing a vehicle, thereby causing the boom assembly 14 to be approximately 20° above horizontal. FIG. 10 shows both the small piston 56 and the large piston 50 fully extended to place the boom assembly 14 in an approximately vertical stowing position. The boom assembly 14 is shown in these positions for example only and is not meant to limit the invention with extension of pistons and boom assembly 14 position.

In summary, the invention comprises a two-stage cylinder assembly 38. A large bore diameter piston 50 has a large rod 52 with a small cylinder with a small piston 56 built into the large piston rod 52. The force of the large piston 50 is necessary to properly tilt the boom assembly 14 with a full load on it. This action with the large piston 50 is very slow and is not acceptable to entirely stow the boom assembly 14 to its full vertical position. Therefore, the small piston 56 will take over and promptly finish storing the boom assembly 14. An advantage of the two-stage lift is that it has the power to lift heavy vehicles, yet can stow the boom much more quickly than similarly powered single stage lifts. This is because large powerful cylinders are inherently slower than smaller cylinders under similar conditions.

The small piston rod 58 has a clevis so the large piston rod 52 can push the clevis 42 when tilting and lifting a heavy load. The two-stage cylinder assembly 38 will be contained within the boom lift assembly 16 by rollers 44 placed on a through pin that rides in a track 46 which is attached to each inside of the boom lift assembly 16.

Being built in this manner, the boom assembly 14 will have a pivot point 30 close to the vertical movement of the boom assembly 14, giving maximum boom tilt with minimum distance between pivot points. This will also give a true tilt without moving the crossbar and load forward or back during the tilting operation as in other towing devices. The boom lift assembly 16 will raise approximately straight up and down via one or more vertical cylinders 18 placed along the side of the boom lift assembly 16. The boom lift assembly 16 will ride up and down between pairs of rollers 24 mounted to ribs 36 that are a part of the mounting frame 20. The boom lift assembly 16 preferably has a track 26 attached to each side to accommodate and guide the vertical guide rollers 24.

Designs of the current invention can fit to both trucks and road tractors. The device can be mounted to the towing vehicle in any manner, such as mounted to the frame, or the fifth wheel plate or any other means to attach the current invention to a towing vehicle.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A towing device for attachment to a towing vehicle for lifting and towing a towed vehicle, comprising:
   an attachment assembly adapted to be mounted to the towing vehicle;
   a boom assembly having a longitudinal boom axis and being pivotally connected to the attachment assembly for pivotal movement about a first pivotal axis from a lowered position wherein the longitudinal boom axis extends away from the attachment assembly to a stowed position wherein the boom axis is upstanding;
   a two stage fluid cylinder connected to the attachment assembly and comprising a large cylinder, a large piston movable in the large cylinder from a retracted position to an extended position, a small cylinder rigidly attached to the large piston, a small piston movable within the small cylinder from a retracted position to an extended position;
   the small piston being connected to the boom assembly at a second pivotal axis;
   the large piston exerting more force and being slower than the small piston.

2. The towing device according to claim 1 wherein the large piston is movable within the large cylinder when the boom assembly is adjacent the lowered position and is immovable within the large cylinder when the boom assembly is adjacent the stowed position, and the small piston is movable within the small cylinder when the boom assembly is adjacent the stowed position and is immovable within the small cylinder when the boom assembly is adjacent the lowered position.

3. The towing device according to claim 1 wherein a large piston rod is attached to the large piston, and the small cylinder is attached to the large piston rod.

4. The towing device according to claim 1 wherein a push rod is pivotally connected about a third axis to the small piston and is also pivotally connected about the second axis to the boom assembly.

5. The towing device according to claim 4 wherein a roller is also pivotally connected to the push rod and the small piston for pivotal movement about the third axis.

6. The towing device according to claim 5 wherein a roller guide engages the roller and guides the roller.

7. The towing device according to claim 6 wherein the roller, the large piston, and the small piston extend along the same longitudinal axis.

8. A towing device for attachment to a towing vehicle for lifting and towing a towed vehicle, comprising:
   an attachment assembly adapted to be mounted to the towing vehicle;
   a boom assembly having a longitudinal boom axis and being pivotally connected to the attachment assembly about a first pivotal axis for pivotal movement from a lowered position wherein the longitudinal boom axis extends away from the attachment assembly to a stowed position wherein the boom axis is upstanding;
   a two stage fluid cylinder connected to the attachment assembly and comprising a large cylinder, a large piston movable in the large cylinder from a retracted position to an extended position, a small cylinder, a small piston movable within the small cylinder from a retracted position to an extended position;
   a pushing rod pivotally connected to the small piston for pivotal movement about a second pivotal axis and pivotally connected to the boom assembly for pivotal movement about the first axis;
   the large piston exerting more force and being slower than the small piston.

9. The towing device according to claim 8 wherein a roller is pivotally connected to the pushing rod and is pivotal about the third axis.

10. The towing device according to claim 9 wherein the roller is guided within a track.

11. The towing device according to claim 10 wherein the roller, the small piston, and the large piston follow a vertical path when the attachment assembly is mounted to a towing vehicle.

12. The towing device according to claim 11 wherein the roller, the small piston, and the large piston follow the same vertical path.

13. A towing device for attachment to a towing vehicle for lifting and towing a towed vehicle, comprising:
   an attachment assembly adapted to be mounted to the towing vehicle;
   a boom assembly having a longitudinal boom axis and being pivotally connected to the attachment assembly about a first pivotal axis for pivotal movement from a lowered position wherein the longitudinal boom axis extends away from the attachment assembly to a stowed position wherein the boom axis is upstanding;
   a two stage fluid cylinder connected to the attachment assembly and comprising a large cylinder, a large piston movable in the large cylinder from a retracted position to an extended position, a small cylinder, a small piston movable within the small cylinder from a retracted position to an extended position;
   a pushing rod pivotally interconnecting the small piston to the boom assembly;
   the large piston and the small piston extending along the same longitudinal axis;
   a roller pivotally mounted to the small piston;
   a track guiding the roller;
   the large piston exerting more force and being slower than the small piston.

14. The towing device of claim 13 comprising a second pivotal connection between the pushing rod and the boom assembly and a third pivotal connection between the pushing rod and the small cylinder.

15. The towing device of claim 14 wherein the track, the small piston and the large piston each have a path that follows a common longitudinal axis.

16. The towing device of claim 1, 8, or 13 wherein the first pivotal axis is the only pivotal axis between the boom assembly and the attachment assembly.

* * * * *